(12) United States Patent
Chiu

(10) Patent No.: US 8,294,294 B2
(45) Date of Patent: Oct. 23, 2012

(54) SNAP-MOUNTING TYPE REMOTE CONTROL SWITCH WITH DUAL FUNCTION OF WIRED AND WIRELESS REMOTE CONTROL

(76) Inventor: Shih-Yung Chiu, Sindian (TW)

( * ) Notice: Subject to any disclaimer, the term of this patent is extended or adjusted under 35 U.S.C. 154(b) by 354 days.

(21) Appl. No.: 12/662,863

(22) Filed: May 7, 2010

(65) Prior Publication Data

US 2010/0282586 A1    Nov. 11, 2010

(30) Foreign Application Priority Data

May 8, 2009   (TW) ................................ 98207957 U

(51) Int. Cl.
*B60L 1/14* (2006.01)

(52) U.S. Cl. ...................................... 307/10.8; 362/428

(58) Field of Classification Search ................... 307/10.8
See application file for complete search history.

*Primary Examiner* — Robert L. Deberadinis
(74) *Attorney, Agent, or Firm* — Bacon & Thomas, PLLC

(57) ABSTRACT

A snap-mounting type remote control switch possesses dual function of wired remote control and wireless remote control, which structure at least comprising an electric cable having three sets of leads, and a PC board having a MCU, a RF receiver and a power control circuit; wherein the MCU is for executing control of the power control circuit under wireless remote control mode according to RF control signal(s) received by the RF receiver to enable the power supplied from an electric power source to appear as an output through one or more sets of leads of the electric cable in the form of positive voltage or negative voltage; particularly the snap-mounting type remote control switch being mounted on a control panel of a vehicle is provided for a driver of the vehicle in application of wired or wireless remotely controlling a rotatable lamp fastened on the vehicle to adjust illumination angle in both vertical and horizontal direction.

4 Claims, 6 Drawing Sheets

SNAP-MOUNTING TYPE REMOTE CONTROL SWITCH WITH DUAL FUNCTION OF WIRED AND WIRELESS REMOTE CONTROL

BACKGROUND OF THE PRESENT INVENTION

1. Field of the Present Invention

The invention relates to a snap-mounting type remote control switch and particularly one provided with dual function of wired remote control and wireless remote control.

2. Description of Prior Act

Shown in FIGS. 1 and 2 is a conventional snap-mounting type remote control switch 10 which is an electric power switch mounted on a control panel 50 to supply power source by manual wired-remotely control.

The structure of the remote control switch 10 comprises a housing 11, a power ON/OFF switch 16, a first set power output switch 17, a joy stick switch 18, a outer cover 12 having extended flange 12a mounted on the housing 11 for faxing the snap-mounting type remote control switch 10 on the control panel 50 by means of fastening element 40, a power input cord 14 having a cigarette lighter plug 14a connected to the power ON/OFF switch 16 to form electric connection with DC 12V electric power supply, an electric power cable 15 with three sets of leads 15a, 15b and 15c wherein the first set of leads 15a is connected to the first set power output switch 17, the second set of leads 15b and the third set of leads 15c are connected to the joy stick switch 18, and by employing the control function of the joy stick switch 18 the leads 15b or the leads 15c can form electric connection with the power input cord 14 for the output of DC 12V power.

Referred to FIGS. 1 and 2, when the power input cord 14 is connected to DC 12V power supply, the power ON/OFF switch 16 can be employed for connecting or disconnecting the DC12V power supply through the power input cord 14. However, since the power ON/OFF switch 16 is a selective element, it can be selected to install the switch 16 on or omit the switch 16 from the snap-mounting type remote control switch 10. When the power ON/OFF switch 16 is omitted from the snap-mounting type remote control switch 10, the power input cord 14 is connected to the first set power output cord 17 and the joy stick switch 18 in parallel.

The first power output switch 17 is an ON/OFF power switch for controlling the connection and disconnection of the DC 12V power supply through the power input cord 14 so that DC 12V power shall be supplied or no voltage shall be supplied from the leads 15a of the electric power cable 15.

The joy stick switch 18 is a four-way power switch for controlling the DC 12V power supply through the power input cord 14 to enable a positive voltage of DC+12V supplied from the power output cord 15b or a negative voltage of DC−12V supplied from the power output cord 15c.

From the above we see that the snap-mounting type remote control switch 10 possesses the function of wired remote control by employing three sets of leads 15a, 15b, and 15c of the wired remote control cable 15 to enable an electric power output or disconnect the power output.

Shown in FIG. 3, the application of the snap-mounting type remote control switch 10 is often seen in control of a conventional type rotatable lamp 70 which is electrically connected to the snap-mounting type remote control switch 10, the user can remotely control the ON/OFF, and adjust the illumination angle of the conventional type rotatable lamp 70 by employing the snap-mounting type remote control switch 10 installed on the control panel 50.

The structure of the conventional type rotatable lamp 70 comprises a lamp seat housing 71, a support seat 72 pivotally connected to a bottom side of the lamp seat housing 71 and a bulb 73 installed in the lamp seat housing 71 wherein the bulb 73 of the rotatable lamp 70 is connected to the leads 15a of the snap-mounting type remote control switch 10 to form electric connection. By employing the first set power output switch 17 of the snap-mounting type remote control switch 10 user can turn on or turn off the bulb 73 of the rotatable lamp 70.

A vertical driving motor (not shown in the drawing) is installed inside the support seat 72 of the rotatable lamp 10, and is connected to the second set of leads 15b of the electric power cable 15 of the snap-mounting type remote control switch 10 to form electric connection. Also a horizontal driving motor (not shown in the drawing) in installed inside the support seat 72 of the rotatable lamp 70, and is connected to the third set of leads 15c of the electric power cable 15 of the snap-mounting type remote control switch 10. By employing the joy stick switch 18 on the snap-mounting type remote control switch 10 a direction control can be achieved by means of wired remote control function to vary the vertical and/or horizontal position of the rotatable lamp 70 to vary the illumination angle of the rotatable lamp 70.

However this kind of snap-mounting type remote control switch 10 possesses only the function of wired remote control but not the wireless remote control that results in a limited range of application of the snap-mounting remote control switch 10.

SUMMARY OF THE INVENTION

In view of the above, the major purpose of the present invention is to provide a snap-mounting type remote control switch which is a power switch with the dual function of wired remote control and wireless remote control.

The second purpose of the present invention is to provide a snap-mounting type remote control switch of the invention can be connected to a rotatable lamp, and the user can adjust the illumination angle of the lamp by means of wired remote control or wireless remote control.

The snap-mounting remote control switch comprises a housing, an outer cover, a first set power output switch, a joy stick switch, a PC board, a power input cord and a cable, wherein the housing is mounted on a bottom side of a control panel, and the first set power output switch, the joy stick switch and the PC board are installed in the housing of the snap-mounting type remote control switch of the invention; and the outer cover is mounted on the housing, and has an extended flange through which the outer cover can be fastened on the control panel.

One end of the power input cord is connected to the power source, and the other end is connected to the first set power output switch and the joy stick switch in parallel; The cable comprises three sets of leads wherein the first set of leads is connected to the first power output switch, the second set of leads and the third set of leads are both connected to the joy stick switch.

The first set power switch is a ON/OFF switch which is for the control of power output to determine whether the voltage of input power shall appear on the output end of the first set of leads. The joy stick switch is a four-way power switch which is for the control of power output to determine whether the voltage of the input power shall appear on the output end of the second set of leads or on the output end of the third set of leads in the form of positive voltage or negative voltage.

The PC board of the snap-mounting type remote control switch comprises a micro control unit (MCU), a RF receiver and a power supply control circuit wherein the MCU is an IC element able to execute the specific control function independently and is employed to generate corresponding control signal according to the input signal; the RF receiver is for receiving RF signal and transmitting the received RF signal to the MCU; the power supply control circuit is for executing the control function to determine whether a positive voltage or negative voltage shall be appeared on the second set of leads or the third set of leads of the power output cord under the wireless remote control mode according to the control signal generated by the MCU.

The power input cord of the snap-mounting type remote control switch has a cigarette lighter which is connected to DC 12V electric power source.

The snap-mounting type remote control switch further has a power ON/OFF switch for control of an input power from a power source to determine whether the voltage of the input power shall appear on the input end of the first set power output switch, the joy stick switch or the PC board.

The PC board of the snap-mounting remote control switch further has a signal input circuit and a radio emitting circuit, and possesses the function of radio transmitter.

BRIEF DESCRIPTION OF THE DRAWINGS

FIG. 3 is a schematic drawing showing the application of the snap-mounting type remote control switch shown in FIG. 1 on the control of the conventional type rotatable lamp by means of wired remote control to turn on and turn off the lamp and to adjust the illumination angle when the lamp is turned on.

FIG. 6 is a schematic drawing showing the application of the snap-mounting type remote control switch of the invention on the control of the conventional type rotatable lamp by means of wired remote control and wireless remote control to turn on or turn off the lamp and to adjust the illumination angle when the lamp is turned on.

DETAILED DESCRIPTION OF THE PREFERRED EMBODIMENTS

Figure 1:
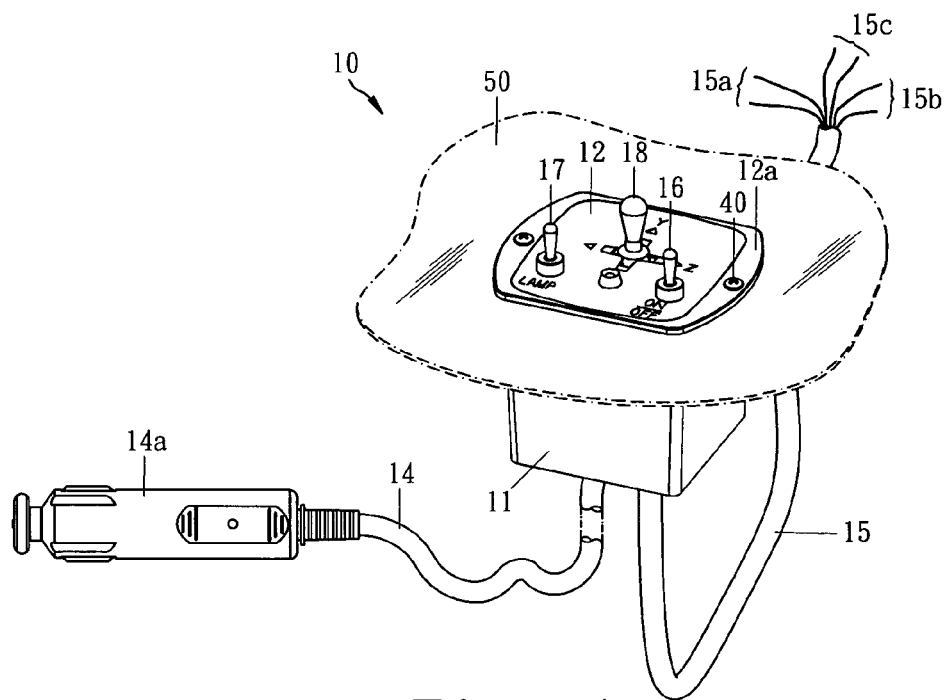
FIG. 1 is a schematic drawing of a conventional snap-mounting type remote control switch having only the wired remote control function.
Figure 2:
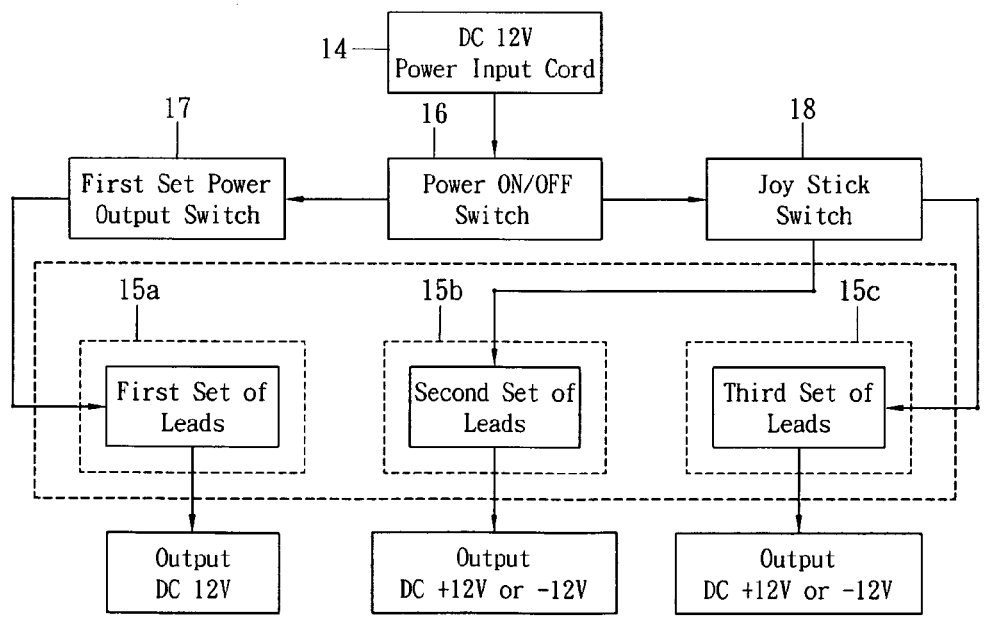
FIG. 2 is an electric circuit block diagram of the snap-mounting type remote control switch shown in FIG. 1.
Figure 3:
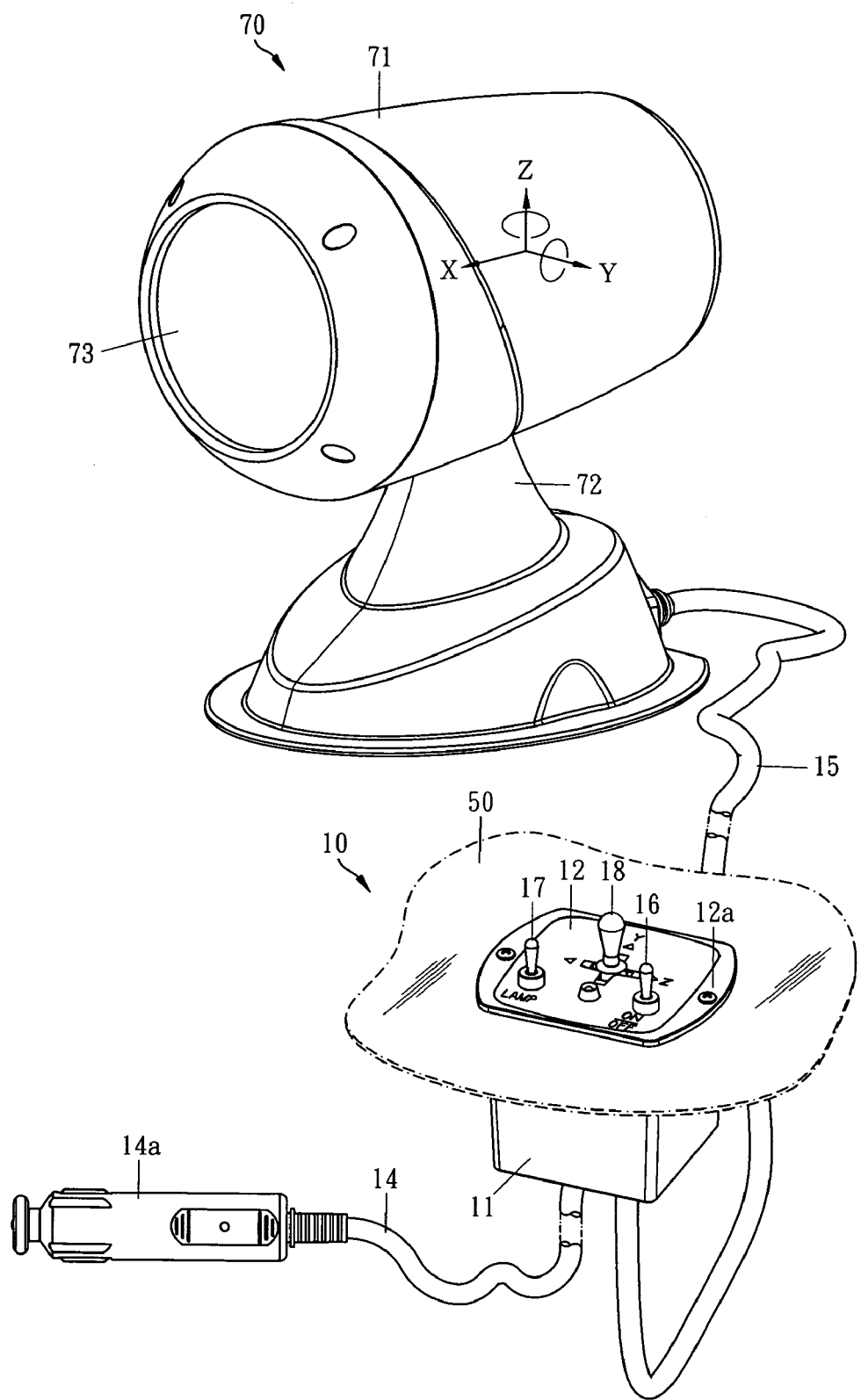
Figure 4:
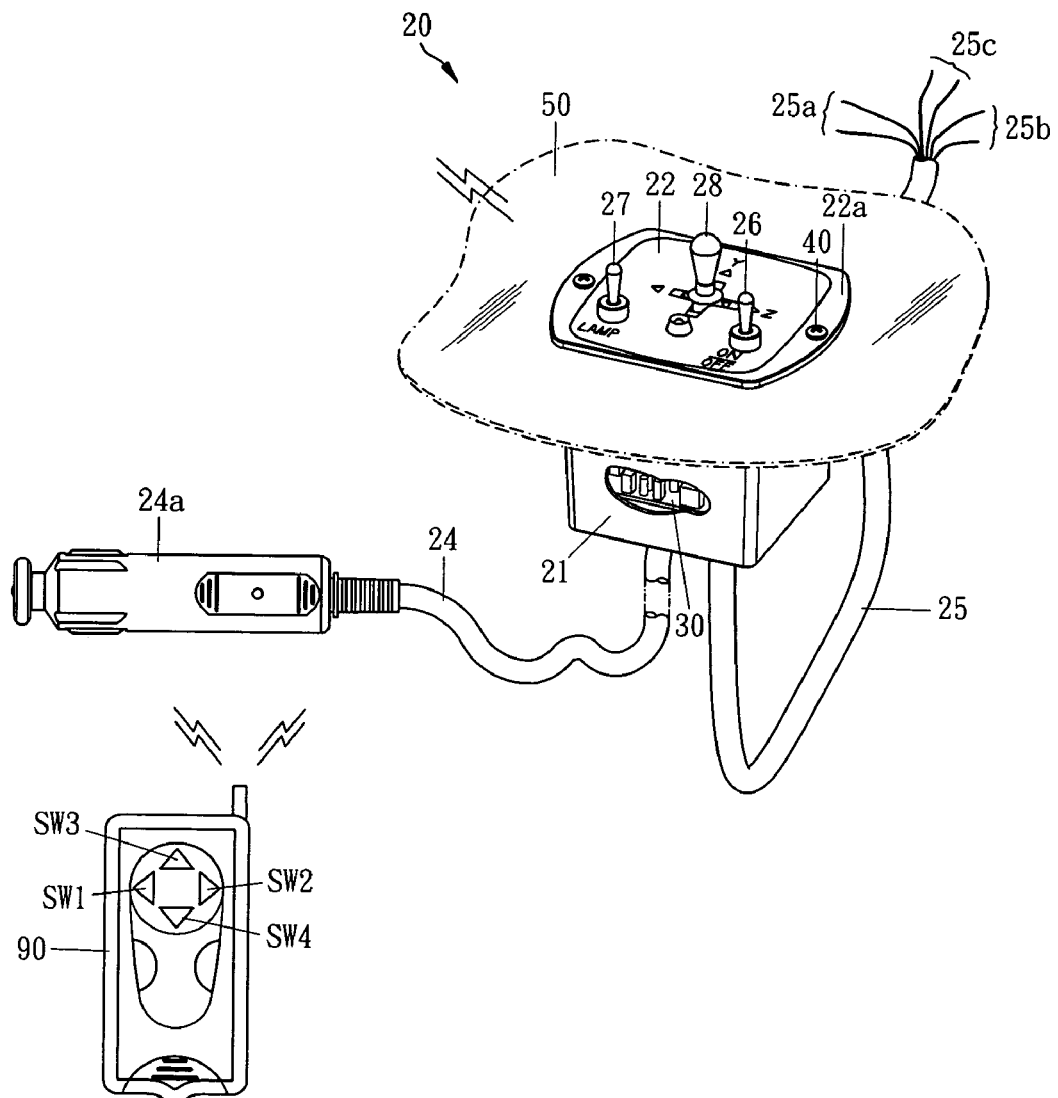
FIG. 4 is a schematic drawing of the snap-mounting type remote control switch of the invention which has the dual function of wired remote control and wireless remote control.
Figure 5:
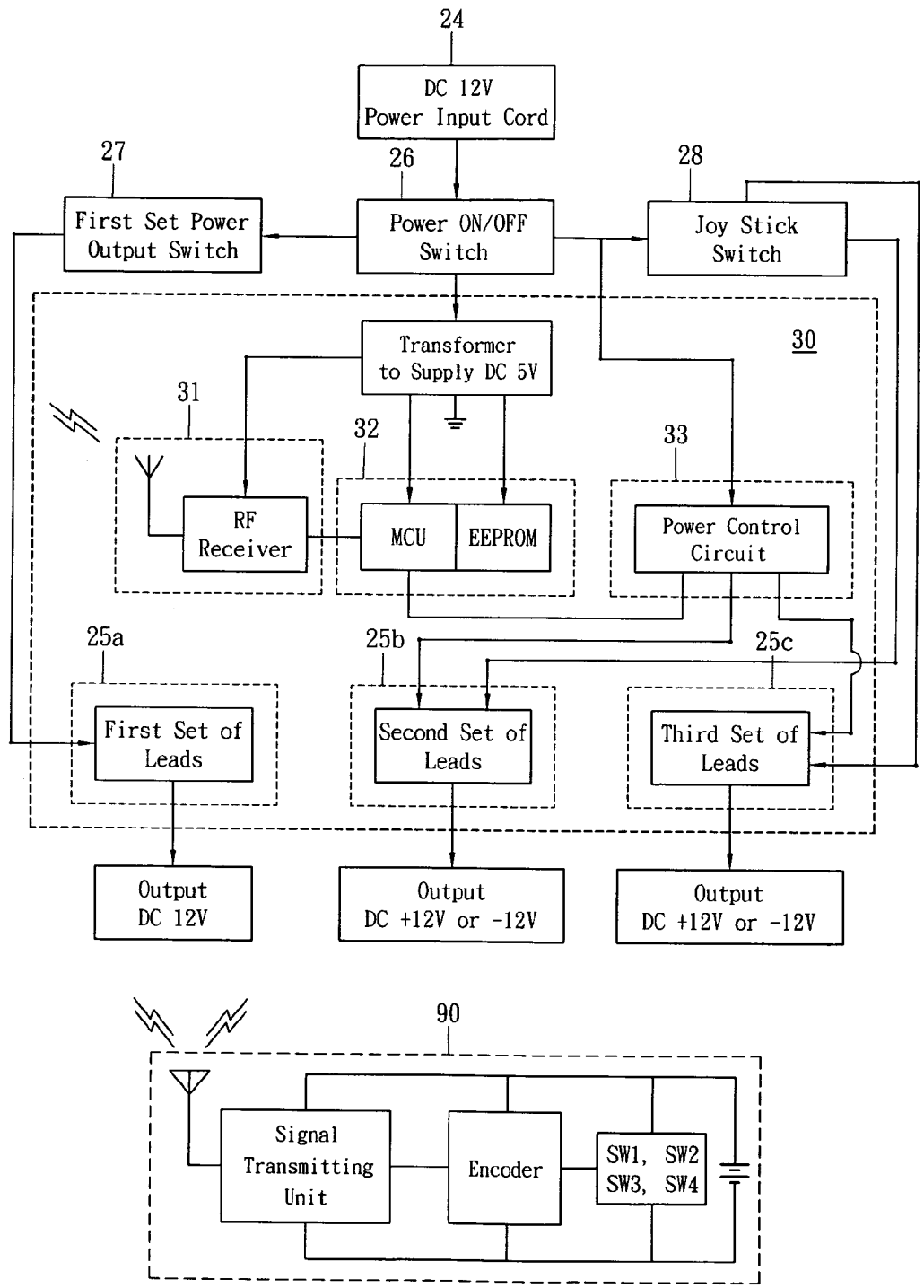
FIG. 5 is an electric circuit block diagram of the snap-mounting type remote control switch and the radio transmitter shown in FIG. 4.
Figure 6:
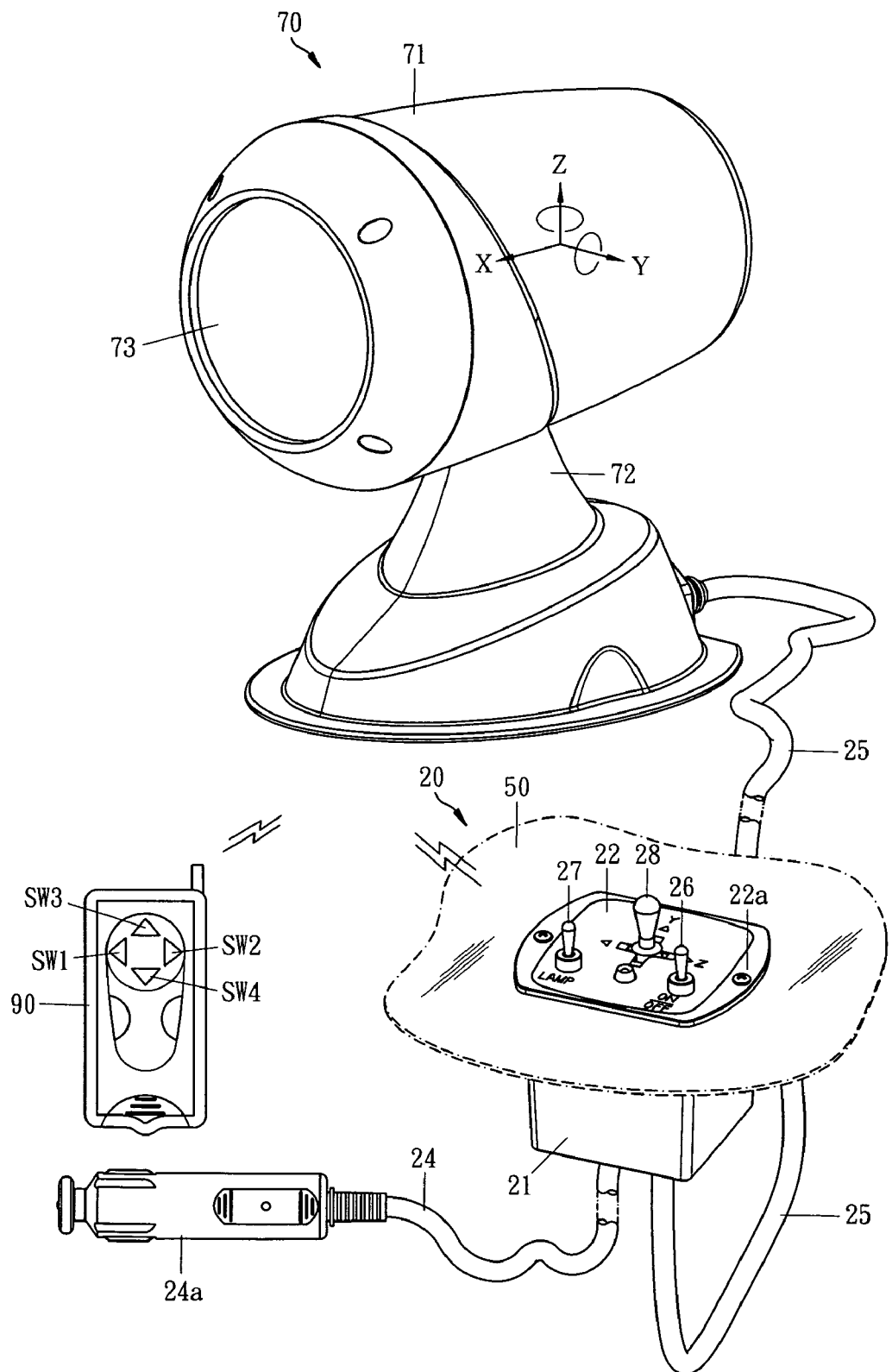

Shown in FIG. 4 through FIG. 6 the snap-mounting type remote control switch 20 of the invention is a power switch mounted on a control panel 50 for control of power supply by means of either wired remote control or wireless remote control to determine whether the power shall be supplied from three set of leads 25a, 25b and 25c of an electric cable 25.

The structure of the snap-mounting remote control switch 20 comprises a housing 21, an outer cover 22, a power input cord 24, an electric cable 25, a first set power output switch 27, a joy stick switch 28 and a PC board 30, or further has a power ON/OFF switch 26 to form another example of embodiment of the snap-mounting remote control switch 20 of the invention.

The housing 21 is shaped like a box for accommodating the power ON/OFF switch 26, the first set power output switch 27, the joy stick switch 28 and the PC board 30. The snap-mounting type remote control switch 20 can be easily installed on a bottom side of the control panel 50 simply by inserting the housing 21 of the snap-mounting remote control switch 20 into a mounting hole formed on the control panel.

The outer cover 22 is mounted on the housing 21 and allowed the movable operation part of the power ON/OFF switch 26, the first set power output switch 27 and the joy stick switch 28 to be exposed to the outside of the housing 21. The outer cover 22 has a flange portion 22a extended outwardly for fastening the outer cover 22 on the control panel 50 with fastening element 40 through which the snap-mounting remote control switch is installed on the control panel 50.

One end of the power input cord 24 is capably connected to a power source which, as for the most preferred embodiment, is a plug or a cigarette lighter 24a for supplying DC 12 V power. The other end of the input power cord 24 is connected to the first set power output switch 27 and the joy stick switch 28 to form parallel connection. However, if the power ON/OFF switch 26 is included in the snap-mounting type remote control switch 20, then the power ON/OFF switch 26 shall be connected to the power source directly.

The electric cable 25 comprises three sets of leads 25a, 25b and 25c of which the first set of leads 25a is connected to the first set power output switch 27. The second set of leads 25b and the third set of leads 25c are both connected to the joy stick switch 28, then the power supplied to the second set of leads 25b and the third set of leads 25c are individually controlled by the joy stick switch 28 for obtaining the positive voltage or negative voltage power supply.

The power ON/OFF switch 26 is an ON/OFF power switch for controlling the power input from the power input cord 24 to determine whether the voltage from the power supply shall appear on the first set power output switch 27 or the joy stick switch 28 or the PC board 30.

The joy stick switch 28 is a four-way power switch for controlling the power from the power input from the power input cord 24 to determine whether the voltage from the power supply shall appear on the second set of leads 25b or the third set of leads 25c of the power cable 25 as positive voltage or negative positive.

The PC board 30 comprises at least a RF receiver 31, a MCU 32 and a power control circuit 33 which can remotely control leads 25b and 25c of the power cable 25 by RF signal to determine whether power output voltage shall appear on leads 25b and 25c.

The PC board 30 further has a 5V transformer. When the input power cord 24 is connected to power source, a DC 5V power shall be supplied to the RF receiver 31, the MCU 32 and power control circuit 33.

The MCU 32 is an IC element, which integrates related circuits of CPU, ROM or EEPROM (Electrically-Erasable Programmable Read Only Memory), RAM, I/O control circuit and time counter (CTC), capable to independently execute specific functions.

The RF receiver 31 is for receiving the identification code and RF signal emitted from another radio transmitter 90 at remote place, and transferring the identification code and RF signal to the input port of the MCU 32 for confirmation, and after the RF signal is confirmed by the MCU 32, the RF signal is decoded into corresponding controlled signal which will then be transmitted out by the MCU 32.

The power control circuit 33 is a relay circuit for controlling "ON" and "OFF" of a circuit, and is for executing the power supply control according to the corresponding controlled signal generated by the MCU 32. Under the wireless remote control mode the power control circuit 33 can control the power from the power input cord 24 to determine whether the voltage from the power supply shall appear on the second set of leads 25b or the third set of leads 25c in the form of positive voltage or negative voltage.

Shown in FIG. 6 when the snap-mounting type remote control switch 20 of the invention is in electrical connection with a conventional type rotatable lamp 70, the user of the lamp 70 can operate the first set power output switch 27 of the snap-mounting type remote control switch 20 to turn on the bulb 73 of the rotatable lamp 70, and then can change the angular position of the rotatable lamp 70 in vertical and horizontal direction by means of wired remote control to operate the joy stick switch 28 of the snap-mounting type remote control switch 20 or by means of the wireless remote control to operate the portable radio transmitter 90 to generate, from remote place, the direction control signal from the direction control key SW1, SW2 SW3 or SW4 to vary the illumination angle of the rotatable lamp 70.

Figure 7:
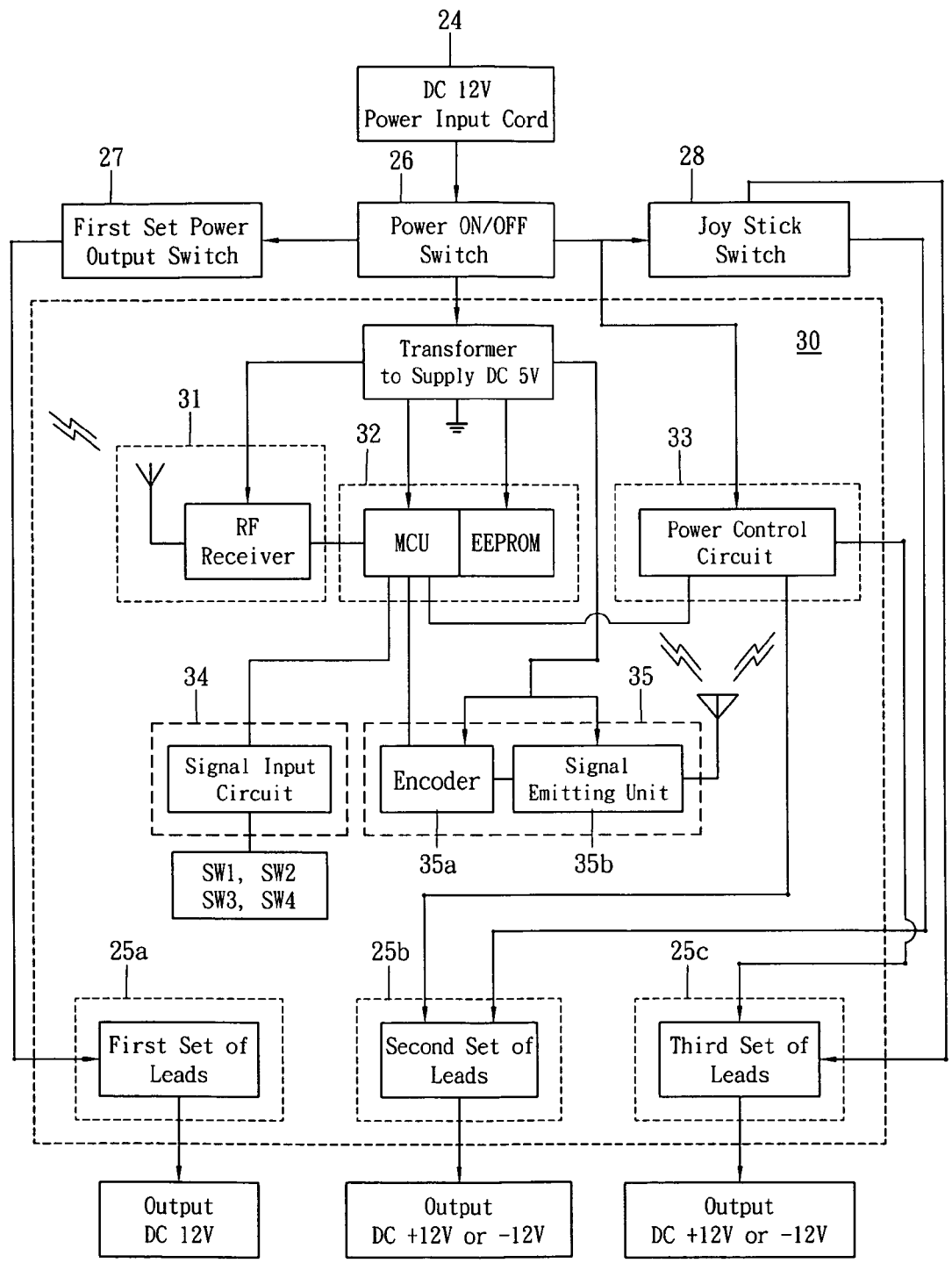
FIG. 7 is another embodiment of an electric circuit block diagram of the snap-mounting type remote control switch of the invention with function of radio transmitter.

As shown in FIG. 7 is another example of embodiment of the snap-mounting type remote control switch 20 of the invention in which the PC board 30 further has a signal input circuit 34 and a radio emitting circuit 35, and has the function of radio transmitter.

The signal input circuit 34 comprises a set of control keys SW1, SW2, SW3 and SW4. When one of the control key SW1, SW2, SW3 or SW4 is depressed the input signal received by the signal input circuit 34 is transmitted to the MCU 32, and after confirmation by the MCU 32 the corresponding control signal will be generated by the MCU 32.

The radio emitting circuit 35 comprises an encoder 34a, and a signal emitting unit 34b. When the control signal is generated by the MCU 32 according to the control key SW1, SW2, SW3 or SW4, the signal is immediately converted into RF signal through the encoder 34a, and then emitted out by the signal emitting unit 34b.

However the embodiment described above is only the preferred form of the invention, it is understood that any partial change or modification which is apparent to those skills in the art without departing from the spirit of the invention shall still be covered by the range of the appended claims of the invention.

What is claimed is:

1. A snap-mounting type remote control switch mounted on a control panel possessing dual function of wired remote control and wireless remote control of power supply through three sets of leads of an electric cable, comprising a housing mounted into the control panel for accommodating a first set power output switch, a joy stick switch and a PC board therein;

an outer cover mounted on the housing having outwardly extended flange for being fastened on the control panel;

a power input cord having one end connected to an electric power source and another end connected to the first set power output switch and the joy stick switch to form parallel connection; and the electric cable comprising three sets of leads of which a first set of leads is connected to the first set power output switch, the second set of leads and the third set of leads both are connected to the joy stick switch;

wherein the first set power output switch is an ON/OFF power switch for control of power input from the electric power source to determine whether the voltage of the input power appears as an output from the first set of leads of the electric cable;

the joy stick switch is a four-way power switch for control of power input from the electric power source to determine whether the voltage of the input power appears as an output from the second set of leads or the third set of leads of the electric cable in the form of positive voltage or negative voltage;

the PC board comprises:

a micro control unit (MCU) which is an IC element for independently executing specific control function and generating correspondingly controlled signals according to an input signal;

a RF receiver for receiving RF signal and transmitting the received RF signal to the MCU; and a power control circuit for executing control of input power supplied from electric power source to determine, under the wireless remote control mode, according to the control signal from the MCU, whether the voltage of input power appears as an output from the second set of leads or the third set of leads of the electric cable in the form of positive voltage or negative voltage.

2. The snap-mounting type remote control switch as described in claim 1, wherein the power input cord has a cigarette lighter or a plug for being connected to a DC 12V electric power source.

3. The snap-mounting type remote control switch as described in claim 2, which further includes a power ON/OFF switch for controlling the input power from the electric power source to determine whether the voltage of input power appear as an input to the first set power output switch, the joy stick switch or the PC board.

4. The snap-mounting type remote control switch as described in claim 2, wherein the PC board further includes a signal input circuit, and possesses the function of radio transmitter.

* * * * *